United States Patent
Kraus et al.

(10) Patent No.: US 10,961,152 B2
(45) Date of Patent: Mar. 30, 2021

(54) COPOLYMERS SUITABLE FOR PLASTICIZING INORGANIC BINDER SYSTEMS

(71) Applicant: Construction Research & Technology GmbH, Trostberg (DE)

(72) Inventors: Alexander Kraus, Trostberg (DE); Maxim Pulkin, Mannheim (DE); Tatiana Mitkina, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 186 days.

(21) Appl. No.: 16/341,330

(22) PCT Filed: Sep. 29, 2017

(86) PCT No.: PCT/EP2017/074733
§ 371 (c)(1),
(2) Date: Apr. 11, 2019

(87) PCT Pub. No.: WO2018/069062
PCT Pub. Date: Apr. 19, 2018

(65) Prior Publication Data
US 2020/0048149 A1    Feb. 13, 2020

(30) Foreign Application Priority Data
Oct. 12, 2016   (EP) .................... 16193509

(51) Int. Cl.
C04B 24/26 (2006.01)
C04B 28/08 (2006.01)
C08F 216/14 (2006.01)
C08F 220/28 (2006.01)
C08F 220/58 (2006.01)
C04B 103/40 (2006.01)

(52) U.S. Cl.
CPC ........ C04B 24/267 (2013.01); C04B 24/2658 (2013.01); C04B 28/08 (2013.01); C08F 216/1416 (2013.01); C08F 220/28 (2013.01); C08F 220/58 (2013.01); C04B 2103/408 (2013.01); C08F 216/1433 (2020.02); C08F 220/286 (2020.02)

(58) Field of Classification Search
CPC ... C04B 24/267; C04B 24/2658; C04B 28/08; C08F 216/1416; C08F 220/28; C08F 220/58
See application file for complete search history.

(56) References Cited

U.S. PATENT DOCUMENTS

| | | |
|---|---|---|
| 2008/0108732 A1 | 5/2008 | Wieland et al. |
| 2010/0010139 A1 | 1/2010 | Davidovits et al. |
| 2011/0034592 A1 | 2/2011 | Lorenz et al. |
| 2015/0080500 A1 | 3/2015 | Dierschke et al. |

FOREIGN PATENT DOCUMENTS

| | | |
|---|---|---|
| EP | 0 323 521 A1 | 7/1989 |
| EP | 0850895 A1 | 7/1998 |
| EP | 1103570 A2 | 5/2001 |
| EP | 1110981 A2 | 6/2001 |
| EP | 1142847 A2 | 10/2001 |
| WO | WO-02/060555 A1 | 8/2002 |
| WO | WO-2006/042709 A1 | 4/2006 |
| WO | WO-2008/012438 A2 | 1/2008 |
| WO | 2013/152963 A1 | 10/2013 |

OTHER PUBLICATIONS

Elvira, et al., "Vinyl pyrrolidone-methacrylic monomers bearing salicylic acid derivative moieties: copolymerization parameters and microstructure analysis", Polymer, vol. 41, Issue 20, Sep. 2000, pp. 7303-7309.
European Search Report for EP Patent Application No. 16193509.3, dated Jan. 4, 2017, 3 pages.
Shi, et al., "Alkali-Activated Cements and Concretes", Taylor & Francis, London & New York, 2006, pp. 1-63.
International Search Report for PCT/EP2017/074733 dated Nov. 17, 2017.
International Preliminary Report on Patentability for PCT/EP2017/074733 dated Apr. 16, 2019.

*Primary Examiner* — John E Uselding
(74) *Attorney, Agent, or Firm* — Curatolo Sidoti Co., LPA; Salvatore A Sidoti; Floyd Trillis, III

(57) ABSTRACT

Copolymers that comprise salicylic acid derivative structural units and structural units having free polyether side chains. The copolymers are suitable to plasticize inorganic binder systems, construction chemical compositions comprising the copolymers and the use of the copolymers as a plasticizer for inorganic binder systems. Binder systems with a reduced amount of Portland cement comprising at least one copolymer of the invention provide a better liquefaction and processability as compared to the binder systems without a copolymer of the invention.

18 Claims, No Drawings

COPOLYMERS SUITABLE FOR PLASTICIZING INORGANIC BINDER SYSTEMS

CROSS REFERENCE TO RELATED APPLICATIONS

This application is a national stage application of International Application No. PCT/EP2017/074733, filed 29 Sep. 2017, which claims priority from European Patent Application No. 16193509.3, filed 12 Oct. 2016, which applications are incorporated herein by reference.

The present invention relates to copolymers that are suitable to plasticize (fluidize) inorganic binder systems, construction chemical compositions comprising said copolymers and the use of said copolymers as dispersants, in particular plasticizers (water reducing agents), for inorganic binders.

The current discussion on reducing $CO_2$-emissions puts a strong pressure on cement producers to reduce the content of Portland cement in concrete and to replace it by latent hydraulic and pozzolanic waste products like slags and fly ashes. The use of such supplementary cementitious materials is limited by two hurdles: Firstly, these products show a rather low hydraulic reactivity compared to Portland cement, which results in a slow binding process and low early strengths. Secondly, no suitable plasticizers for these systems are currently available, which would allow for a reduction of the water content without reducing the fluidity and processability of the binder systems.

Very effective water reducing additives for Portland Cement based binder systems are, for example, polycarboxylate ethers having a comb-like structure due to polyalkylene oxide side chains and polycondensates such as naphthalene sulfonic acid/formaldehyde or melamine sulfonic acid/formaldehye condensates, for example as described in EP 1 103 570 A2, EP 0850 895 A1, EP 1 110 981 A2, EP 1 142 847 A2 or WO 2006/042709 A1. Comb polymers prepared through polycondensation of polyethyleneglycol monophenylether and phenoxyethanol phosphate with formaldehyde are excellent superplasticizers for concrete, based on ordinary portland cement. These polymers however, fail to be effective in Portland cement-free binders. In WO 2013/152963 it was found that the liquefying effect with slag-based binders can be significantly improved by the incorporation of aromatic compounds such as salicylic acid as an additional component into said polycondensation product. The salicylic acid modified comb polymers have some distinct drawbacks: Firstly, formaldehyde is required for the polymerization reaction and the resulting polymers therefore contain a certain amount of residual formaldehyde with is undesirable under environmental and health aspects. Secondly, salicylic acid has a rather low reactivity towards polycondensation with formaldehyde. The amount of salicylic acid that can be incorporated into the polycondensates is therefore limited. Thirdly, the combination with cationic functionalized monomers, that had also been proven to be efficient for slag-based binders, is difficult due to the lack of suitable cationically functionalized phenolethers.

Polymer 41 (2000) 7303-7309 describes copolymers of vinyl pyrrolidone and 2-hydroxy-4-methacrylamidobenzoic acid or 4-hydroxy-5-methacrylamidobenzoic acid.

EP 323 521 A1 discloses a curable composition comprising (meth)acrylamide monomers such as (meth)acryloylaminosalicylic acid. The composition also comprises a polyfunctional (meth)acrylate monomer such as bisphenol-A ethoxylate dimethacrylate.

WO 02/060555 A1 describes a polymer comprising salicylic acid groups and its use in a method of flocculating suspended solids in a Bayer process liquor.

US 2011/0034592 A1 discloses a copolymer of an isoprenol polyether derivative with an acrylic acid derivative. The aqueous copolymer solution is suitable as a superplasticizer for hydraulic binders.

The problem underlying the invention is therefore to eliminate above described drawbacks. In particular, the problem is to provide a plasticizer that is effective for plasticization of binder systems having a reduced content of Portland cement.

The problem is solved by the following embodiments:

1. Copolymer, comprising structural units of formula (I)

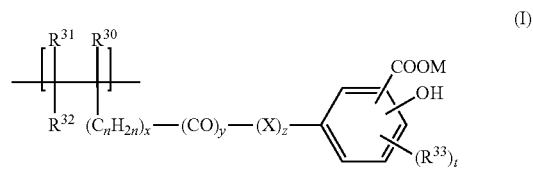

wherein
$R^{30}$, $R^{31}$ and $R^{32}$ independently of each other represent a hydrogen atom, an alkyl group with 1 to 6 carbon atoms or COOM;
X is NH, N($C_1$-$C_4$ alkyl) or O;
$R^{33}$ is OH, $NR^{34}R^{35}$, COOM, $COOR^{34}$, $SO_3M$, $SO_3R^{34}$, $NO_2$, $C_1$-$C_6$ alkoxy or $C_1$-$C_6$ alkyl;
$R^{34}$ and $R^{35}$ independently of each other represent H, $C_1$-$C_6$ alkyl, phenyl, $C_1$-$C_6$ alkylphenyl or phenyl-$C_1$-$C_6$ alkyl;
t is 0, 1, 2, or 3;
x is 0 or 1;
n is 1, 2 or 3;
y is 0 or 1;
z is 0 or 1; and
M is H or a cation equivalent; and
structural units having free polyether side chains.

2. The copolymer of embodiments 1 or 2, wherein t is 1, 2 or 3, preferably 1 or 2, and $R^{33}$ is OH, COOM, $C_1$-$C_6$ alkoxy or $C_1$-$C_6$ alkyl.

3. The copolymer of embodiment 1, wherein t is 0, 1 or 2.

4. The copolymer of any one of the preceding embodiments, wherein x is 0, y is 1 and z is 1.

5. The copolymer of any one of embodiments 1 to 3, wherein x is 1, n is 1 or 2, y is 0 and z is 1.

6. The copolymer of any one of embodiments 1 to 3, wherein x is 0, y is 0 and z is 1.

7. The copolymer of embodiment 4, wherein X is O, NH or N($C_1$-$C_4$ alkyl), in particular NH.

8. The copolymer of embodiment 5 or 6, wherein X is O.

9. The copolymer of any one of the preceding embodiments, wherein $R^{30}$ is H or $CH_3$.

10. The copolymer of any one of the preceding embodiments, wherein $R^{31}$ is H.

11. The copolymer of any one of the preceding embodiments, wherein $R^{32}$ is H or COOM.

12. The copolymer of any one of the preceding embodiments comprising structural units of formula (Ia)

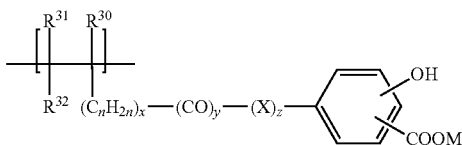

(Ia)

wherein $R^{30}$, $R^{31}$, $R^{32}$, n, x, y, z, and M are as defined in embodiment 1.

13. The copolymer of any one of the preceding embodiments comprising structural units of formula (Ib)

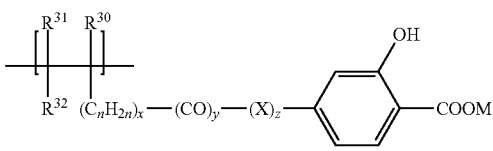

(Ib)

wherein $R^{30}$, $R^{31}$, $R^{32}$, n, x, y, z, and M are as defined in embodiment 1.

14. The copolymer of any one of the preceding embodiments comprising structural units of formula (Ic)

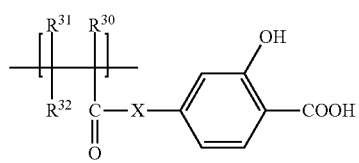

(Ic)

wherein $R^{30}$, $R^{31}$, $R^{32}$ are as defined in embodiment 1.

15. The copolymer of embodiment 14, wherein $R^{30}$ is H or $CH_3$, $R^{31}$ is H and $R^{32}$ is H or COOM.

16. The copolymer of any one of the preceding embodiments, wherein the structural units having free polyether side chains are selected from units of the formulae (IIa), (IIb), (IIc) and/or (IId):

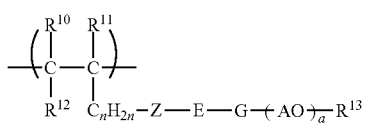

(IIa)

wherein
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$ (—$CH_2$-cyclohexyl-), 1,2-phenylene, 1,3-phenylene or 1,4-phenylene;
G is O, NH or CO—NH; or
E and G together are a chemical bond;
A is $C_xH_{2x}$ with x=2, 3, 4 or 5, preferably 2 or 3, or is $CH_2CH(C_6H_5)$;
n is 0, 1, 2, 3, 4 or 5, preferably 0, 1 or 2;
a is an integer from 2 to 350, preferably 5 to 150;
$R^{13}$ is H, an unbranched or branched $C_1$-$C_4$ alkyl group, CO—$NH_2$ and/or $COCH_3$;

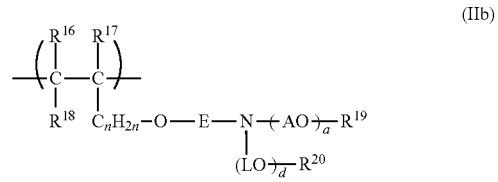

(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$ (—$CH_2$-cyclohexyl-), 1,2-phenylene, 1,3-phenylene, or 1,4-phenylene, or is a chemical bond;
A is $C_xH_{2x}$ with x=2, 3, 4 or 5, preferably 2 or 3, or is $CH_2CH(C_6H_5)$;
n is 0, 1, 2, 3, 4 and/or 5, preferably 0, 1 Or 2;
L is $C_xH_{2x}$ with x=2, 3, 4 or 5, preferably 2 or 3, or is $CH_2CH(C_6H_5)$;
a is an integer from 2 to 350, preferably 5 to 150;
d is an integer from 1 to 350, preferably 5 to 150;
$R^{19}$ is H or an unbranched or branched $C_1$-$C_4$ alkyl group;
$R^{20}$ is H or an unbranched $C_1$-$C_4$ alkyl group;

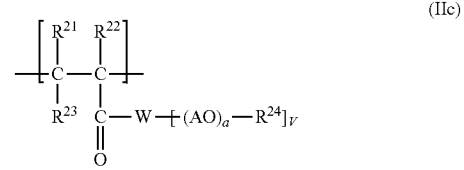

(IIc)

in which
$R^{21}$, $R^{22}$ and $R^{23}$ independently of one another are H or an unbranched or branched $C_1$-$C_4$ alkyl group;
W is O, $NR^{25}$, Or is N;
V is 1 if W=O or $NR^{25}$, and is 2 if W=N;
A is $C_xH_{2x}$ with x=2, 3, 4 or 5, preferably 2 or 3, or is $CH_2CH(C_6H_5)$;
a is an integer from 2 to 350, preferably 5 to 150;
$R^{24}$ is H or an unbranched or branched $C_1$-$C_4$ alkyl group; and
$R^{25}$ is H or an unbranched or branched $C_1$-$C_4$ alkyl group;

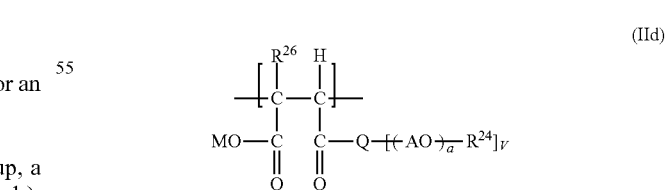

(IId)

in which
$R^{26}$ is H or an unbranched or branched $C_1$-$C_4$ alkyl group;
Q is $NR^{10}$, N or O;
V is 1 if Q=O or $NR^{10}$ and is 2 if Q=N;
$R^{10}$ is H or an unbranched or branched $C_1$-$C_4$ alkyl group; and A is $C_xH_{2x}$ with x=2, 3, 4 or 5, preferably 2 or 3, or is $CH_2CH(C_6H_5)$;
$R^{24}$ is H or an unbranched or branched $C_1$-$C_4$ alkyl group;
M is H or a cation equivalent; and
a is an integer from 2 to 350, preferably 5 to 150;

17. The copolymer of embodiment 16, wherein the copolymer comprises structural units of at least one of formulas (IIa), (IIc) and (IId).

18. The copolymer of embodiment 16 or 17, wherein the copolymer comprises structural units of formula (IIa), in which E and G together are a bond.

19. The copolymer of embodiment 16 or 17, wherein the copolymer comprises structural units of formula (IIa), in which Z is O.

20. The copolymer of embodiment 16 or 17, wherein the copolymer comprises structural units of formula (IIa), in which n is 1 or 2.

21. The copolymer of embodiment 16 or 17, wherein the copolymer comprises structural units of formula (IIa), in which E is an unbranched or branched $C_1$-$C_6$ alkylene group, in particular an unbranched or branched $C_3$-$C_4$ alkylene group.

22. The copolymer of embodiment 16 or 17, wherein the copolymer comprises structural units of formula (IIa), in which G is O.

23. The copolymer of embodiment 16 or 17, wherein the copolymer comprises structural units of formula (IIa), in which n is 0.

24. The copolymer of embodiment 16 or 17, wherein the copolymer comprises structural units of formula (IIa), in which A is $C_xH_{2x}$ with x=2 and/or 3.

25. The copolymer of embodiment 16 or 17, wherein the copolymer comprises structural units of formula (IIa), in which $R^{10}$ and $R^{12}$ are H, and $R^{11}$ is H or $CH_3$.

26. The copolymer of embodiment 16 or 17, wherein the copolymer comprises structural units of formula (IIc), in which W is O.

27. The copolymer of embodiment 16, 17, or 26, wherein the copolymer comprises structural units of formula (IIc), in which A is $C_xH_{2x}$ with x=2 and/or 3.

28. The copolymer of embodiment 16, 17, or 26, wherein the copolymer comprises structural units of formula (IIc), in which $R^{21}$ and $R^{22}$ are H, and $R^{23}$ is H or $CH_3$.

29. The copolymer of embodiment 16, wherein the copolymer comprises
(a) structural units of the formula (IIa) in which $R^{10}$ and $R^{12}$ are H, $R^{11}$ is H or $CH_3$, E and G together are a chemical bond, A is $C_xH_{2x}$ with x=2 and/or 3, a is 5 to 100, n is 1 or 2 and $R^{13}$ is H or an unbranched or branched $C_1$-$C_4$ alkyl group; and/or
(b) structural units of the formula (IIa) in which $R^{10}$ and $R^{12}$ are H, $R^{11}$ is H or $CH_3$, n is 0, Z is O, E is an unbranched or branched $C_1$-$C_6$ alkylene group, G is O, A is $C_xH_{2x}$ with x=2 and/or 3, a is 5 to 100, and $R^{13}$ is H or an unbranched or branched $C_1$-$C_4$ alkyl group; and/or
(c) structural units of the formula (IIb) in which $R^{16}$ and $R^{18}$ are H, $R^{17}$ is H or $CH_3$, E is an unbranched or branched $C_1$-$C_6$ alkylene group, A is $C_xH_{2x}$ with x=2 and/or 3, L is $C_xH_{2x}$ with x=2 and/or 3, a is an integer from 2 to 150, d is an integer from 1 to 150, $R^{19}$ is H or an unbranched or branched $C_1$-$C_4$ alkyl group, and $R^{20}$ is H or an unbranched or branched $C_1$-$C_4$ alkyl group; and/or
(d) structural units of the formula (IIc) in which $R^{21}$ and $R^{23}$ are H, $R^{22}$ is H or $CH_3$, W is O, A is $C_xH_{2x}$ with x=2 and/or 3, a is an integer from 5 to 100, and $R^{24}$ is H or an unbranched or branched $C_1$-$C_4$ alkyl group; and/or
(e) structural units of the formula (IId) in which $R^6$ is H, Q is O, $R^7$ is $(C_nH_{2n})$—O-$(AO)_aR^9$, n is 2 and/or 3, A is $C_xH_{2x}$ with x=2 and/or 3, a is an integer from 1 to 150 and $R^9$ is H or an unbranched or branched $C_1$-$C_4$ alkyl group.

30. The copolymer of any one of embodiments 16 to 29, comprising structural units derived from $C_1$-$C_4$ alkyl-polyethylene glycol acrylic acid ester, polyethylene glycol acrylic acid ester, $C_1$-$C_4$ alkyl-polyethylene glycol methacrylic acid ester, polyethylene glycol methacrylic acid ester, $C_1$-$C_4$ alkyl-polyethylene glycol acrylic acid ester, polyethylene glycol acrylic acid ester, vinyloxy-$C_2$-$C_4$ alkylene-polyethylene glycol, vinyloxy-$C_2$-$C_4$ alkylene-polyethylene glycol $C_1$-$C_4$ alkyl ether, allyloxypolyethylene glycol, allyloxypolyethylene glycol $C_1$-$C_4$ alkyl ether, methallyloxy-polyethylene glycol, methallyloxy-polyethylene glycol $C_1$-$C_4$ alkyl ether, isoprenyloxy-polyethylene glycol and/or isoprenyloxy-polyethylene glycol $C_1$-$C_4$ alkyl ether.

31. The copolymer of any one of embodiments 17 to 31, wherein the molar ratio of structural units (I):(II) is in the range of 5:1 to 1:3.

32. The copolymer of any one of the preceding embodiments, wherein the molar weight of the polyether side chains is >300 g/mol, preferably >500 g/mol and <8000 g/mol, preferably <5000 g/mol.

33. The copolymer of embodiment 32, wherein the molar weight of the polyether side chains is in the range from 300-5000 g/mol, more particularly 500-3000 g/mol.

34. The copolymer of any one of the preceding embodiments, additionally comprising structural units of the general formulae (IIIa), (IIIb), (IIIc) and/or (IIId):

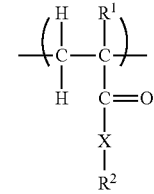

(IIIa)

in which
$R^1$ is H or an unbranched or branched $C_1$-$C_4$ alkyl group, $CH_2COOH$ or $CH_2CO$—X—
$R^2$, preferably H or $CH_3$;
X is NH—$(C_nH_{2n})$, $O(C_nH_{2n})$ with n=1, 2, 3 or 4, where the nitrogen atom or the oxygen atom is bonded to the CO group, or is a chemical bond, preferably X is chemical bond or $O(C_nH_{2n})$;
$R^2$ is OM, $PO_3M_2$, or O—$PO_3M_2$, with the proviso that X is a chemical bond if $R^2$ is OM;

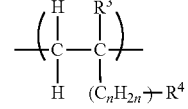

(IIIb)

in which
$R^3$ is H or an unbranched or branched $C_1$-$C_4$ alkyl group, preferably H or $CH_3$;
n is 0, 1, 2, 3 or 4, preferably 0 or 1;
$R^4$ is $PO_3M_2$, or O—$PO_3M_2$;

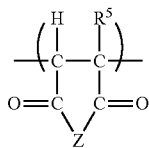

(IIIc)

in which

R$^5$ is H or an unbranched or branched C$_1$-C$_4$ alkyl group, preferably H;

Z is O or NR$^7$, preferably O;

R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)OPO$_3$M$_2$, and n is 1, 2, 3 or 4, preferably 1, 2 or 3;

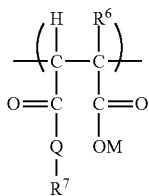

(IIId)

in which

R$^6$ is H or an unbranched or branched C$_1$-C$_4$ alkyl group, preferably H;

Q is NR$^7$ or O, preferably O;

R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)OPO$_3$M$_2$, n is 1, 2, 3 or 4, preferably 1, 2 or 3; and each M in the formulae (IIIa) to (IIId) independently of one another is H or a cation equivalent.

35. The copolymer of embodiment 34, comprising structural units of the formula (IIIa) in which R$^1$ is H or CH$_3$; and/or structural units of the formula (IIIb) in which R$^3$ is H or CH$_3$; and/or structural units of the formula (IIIc) in which R$^5$ is H and Z is O; and/or structural units of the formula (IIId) in which R$^6$ is H and Q is O.

36. The copolymer of embodiment 34 or 35, comprising structural units of the formula (IIIa) in which X is a bond and R$^2$ is OM.

37. The copolymer of embodiment 34 or 35, comprising structural units of the formula (IIIa) in which X is O(C$_n$H$_{2n}$) with n=2 or 3, R$^2$ is PO$_3$M$_2$, or O—PO$_3$M$_2$.

38. The copolymer of any one of embodiments 34 to 37, comprising structural units (Ia) and/or (Ib), (II) and (IIIa) and/or (IIIb).

39. The copolymer of any one of embodiments 1 to 33, comprising structural units derived from
    (i) vinyloxybutyl-C$_1$-C$_4$-alkylpolyethylene glycol and (ii) salicylic acid-4-maleamide; or
    (i) vinyloxybutyl-polyethylene glycol and (ii) salicylic acid-4-maleamide; or
    (i) isoprenyloxybutyl-C$_1$-C$_4$-alkylpolyethylene glycol and (ii) salicylic acid-4-maleamide; or
    (i) isoprenyloxybutyl-polyethylene glycol and (ii) salicylic acid-4-maleamide; or
    (i) allyloxy-C$_0$-C$_4$-alkylpolyethylene glycol and (ii) salicylic acid-4-maleamide; or
    (i) allyloxy-polyethylene glycol and (ii) salicylic acid-4-maleamide; or
    (i) methallyloxy-C$_0$-C$_4$-alkylpolyethylene glycol and (ii) salicylic acid-4-maleamide; or
    (i) methallyloxy-polyethylene glycol and (ii) salicylic acid-4-maleamide; or
    (i) C$_1$-C$_4$ alkyl-polyethylene glycol acrylate and (ii) salicylic acid-4-maleamide; or
    (i) polyethylene glycol acrylate and (ii) salicylic acid-4-maleamide; or
    (i) C$_1$-C$_4$ alkyl-polyethylene glycol methacrylate and (ii) salicylic acid-4-maleamide; or
    (i) polyethylene glycol methacrylate and (ii) salicylic acid-4-maleamide.

40. The copolymer of any one of embodiment 34 to 38, comprising structural units derived from
    (i) vinyloxybutyl-C$_1$-C$_4$-alkylpolyethylene glycol, (ii) salicylic acid-4-maleamide and (iii) acrylic acid and/or methacrylic acid; or
    (i) vinyloxybutyl-polyethylene glycol, (ii) salicylic acid-4-maleamide and (iii) acrylic acid and/or methacrylic acid; or
    (i) isoprenyloxybutyl-C$_1$-C$_4$-alkylpolyethylene glycol, (ii) salicylic acid-4-maleamide and (iii) acrylic acid and/or methacrylic acid; or
    (i) isoprenyloxybutyl-polyethylene glycol, (ii) salicylic acid-4-maleamide and (iii) acrylic acid and/or methacrylic acid; or
    (i) allyloxy-C$_1$-C$_4$-alkylpolyethylene glycol, (ii) salicylic acid-4-maleamide and (iii) acrylic acid and/or methacrylic acid; or
    (i) allyloxy-polyethylene glycol, (ii) salicylic acid-4-maleamide and (iii) acrylic acid and/or methacrylic acid; or
    (i) methallyloxy-C$_1$-C$_4$-alkylpolyethylene glycol, (ii) salicylic acid-4-maleamide and (iii) acrylic acid and/or methacrylic acid; or
    (i) methallyloxy-polyethylene glycol, (ii) salicylic acid-4-maleamide and (iii) acrylic acid and/or methacrylic acid; or
    (i) C$_1$-C$_4$ alkyl-polyethylene glycol acrylate, (ii) salicylic acid-4-maleamide and (iii) acrylic acid and/or methacrylic acid; or
    (i) polyethylene glycol acrylate, (ii) salicylic acid-4-maleamide and (iii) acrylic acid and/or methacrylic acid; or
    (i) C$_1$-C$_4$ alkyl-polyethylene glycol methacrylate, (ii) salicylic acid-4-maleamide and (iii) acrylic acid and/or methacrylic acid; or
    (i) polyethylene glycol methacrylate, (ii) salicylic acid-4-maleamide and (iii) acrylic acid and/or methacrylic acid.

41. The copolymer of any one of embodiments 34 to 38, comprising structural units derived from
    (i) vinyloxybutyl-C$_1$-C$_4$-alkylpolyethylene glycol, (ii) salicylic acid-4-maleamide and (iii) phosphoric acid ester of hydroxy-C$_1$-C$_4$-alkylacrylate or -methacrylate; or
    (i) vinyloxybutyl-polyethylene glycol, (ii) salicylic acid-4-maleamide and (iii) phosphoric acid ester of hydroxy-C$_1$-C$_4$-alkylacrylate or -methacrylate; or
    (i) isoprenyloxybutyl-C$_1$-C$_4$-alkylpolyethylene glycol, (ii) salicylic acid-4-maleamide and (iii) phosphoric acid ester of hydroxy-C$_1$-C$_4$-alkylacrylate or -methacrylate; or
    (i) isoprenyloxybutyl-polyethylene glycol, (ii) salicylic acid-4-maleamide and (iii) phosphoric acid ester of hydroxy-C$_1$-C$_4$-alkylacrylate or -methacrylate; or
    (i) allyloxy-C$_1$-C$_4$-alkylpolyethylene glycol, (ii) salicylic acid-4-maleamide and (iii) phosphoric acid ester of hydroxy-C$_1$-C$_4$-alkylacrylate or -methacrylate; or
    (i) allyloxy-polyethylene glycol, (ii) salicylic acid-4-maleamide and (iii) phosphoric acid ester of hydroxy-C$_1$-C$_4$-alkylacrylate or -methacrylate; or (i) methallyloxy-$C_1$-$C_4$-alkylpolyethylene glycol, (ii) salicylic acid-4-maleamide and (iii) phosphoric acid ester of hydroxy-$C_1$-$C_4$-alkylacrylate or -methacrylate; or (i) methallyloxy-polyethylene glycol, (ii) salicylic acid-4-maleamide and (iii) phosphoric acid ester of hydroxy-$C_1$-$C_4$-alkylacrylate or -methacrylate; or (i) $C_1$-$C_4$ alkyl-polyethylene glycol acrylate, (ii) salicylic acid-4-maleamide and (iii) phosphoric acid ester of hydroxy-$C_1$-$C_4$-alkylacrylate or -methacrylate; or (i) polyethylene glycol acrylate, (ii) salicylic acid-4-maleamide and (iii) phosphoric acid ester of hydroxy-$C_1$-$C_4$-alkylacrylate or -methacrylate; or (i) $C_1$-$C_4$ alkyl-polyethylene glycol methacrylate, (ii) salicylic acid-4-maleamide and (iii) phosphoric acid ester of hydroxy-$C_1$-$C_4$-alkylacrylate or -methacrylate; or (i) polyethylene glycol methacrylate, (ii) salicylic acid-4-maleamide and (iii) phosphoric acid ester of hydroxy-$C_1$-$C_4$-alkylacrylate or -methacrylate.

42. The copolymer of any one of the preceding embodiments 16 to 33, wherein a is 5 to 100, in particular 10 to 50.

43. The copolymer of any one of the preceding embodiments comprising structural units derived from a cationic monomer.

44. The copolymer of embodiment 43, comprising structural units derived from a cationic monomer of formula (IV) selected from formula (Iva) and (IVb):

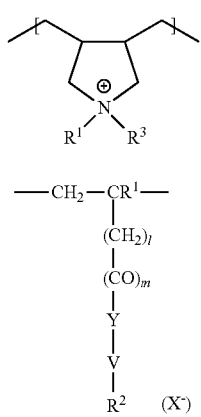

(IVa)

(IVb)

wherein $R^1$ in each occurrence is the same or different and represents H or $CH_3$;

$R^2$ in each occurrence is the same or different and is selected from the group consisting of:

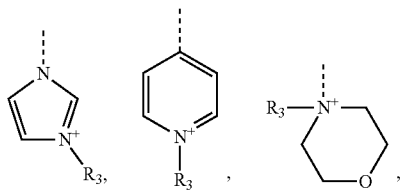

—$N^+R^3R^4R^5$, and/or

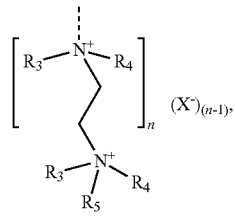

wherein $R^3$, $R^4$ and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, l in each occurrence is the same or different and represents an integer from 0 to 2, m in each occurrence is the same or different and represents 0 or 1, n in each occurrence is the same or different and represents an integer from 1 to 10, Y in each occurrence is the same or different and represents an absent group, oxygen, NH and/or $NR^3$, V in each occurrence is the same or different and represents —$(CH_2)_x$—,

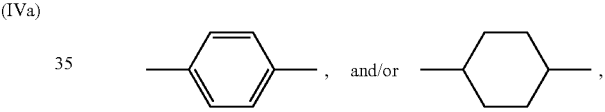

wherein x in each occurrence is the same or different and represents an integer from 0 to 6, and X in each occurrence is the same or different and represents a halogen atom, a $C_{1-4}$-alkyl sulfate, a $C_{1-4}$-alkyl sulfonate, a $C_{6-14}$-(alk)aryl sulfonate and/or a monovalent equivalent of a polyvalent anion, which is selected from a sulfate, a disulfate, a phosphate, a diphosphate, a triphosphate and/or a polyphosphate.

45. The copolymer of embodiment 44, wherein the molar ratio of structural units derived from (IV) to the sum of structural units (I) and (II) is 0.05:1 to 0.3:1.

46. A construction chemical composition comprising a copolymer of any one of claims 1 to 45.

47. The composition of embodiment 46 comprising an inorganic binder, in particular a cementitious or geopolymeric binder.

48. The composition of embodiment 47 comprising a geopolymer binder.

49. The composition of embodiment 48, wherein the geopolymer binder is selected from latent hydraulic binders, pozzolanic binders and/or alkali-activated aluminosilicate binders, and mixtures thereof.

50. The composition of claim 49, wherein the hydraulic binders are selected from, cements, in particular Portland cements, aluminate cements and mixtures thereof.

51. The composition of claim 49, wherein the latent hydraulic binders are selected from industrial or synthetic slags, in particular blast furnace slag, granulated blast furnace slag, ground granulated blast furnace slag, electrothermical phosphorus slag, stainless steel slag, and mixtures thereof, 52. The composition of claim 49, wherein the puzzolanic binders are selected from amorphous silica, pyrogenic silica, microsilica, glass powder, fly ash, in particular brown coal fly ash and mineral coal fly ash, metakaolin, natural puzzolans such as tuff, trass, volcanic ash, natural and synthetic zeoliths and mixtures thereof.

53. The composition of claim 49, wherein the alkali-activated aluminosilicate binders comprise latent hydraulic and/or pozzolanic binders as defined in embodiments 52 or 53, and alkaline activators, in particular alkali metal carbonates, alkali metal fluorides, alkali metal hydroxides, alkali metal aluminates, alkali metal silicates, in particular soluble water glass, and mixtures thereof.

54. The composition of any one of embodiments 47 to 53 comprising
at least one copolymer as defined in any one of claims 1 to 46 in an amount of from 0.1 to 3 wt.-%, based on the total weight of the composition,
an inorganic binder in an amount of from 24.9 to 36 wt.-%, based on the total weight of the composition and
sand in an amount of from 61 to 75 wt.-%, based on the total weight of the composition,
wherein the weight percentages of all components add up to 100 wt.-%.

55. The composition of any one of embodiments 47 to 54, which comprises a geopolymer binder and less than 30 wt.-% of cement, in particular Portland cement, based on the weight of the geopolymer binder.

56. The composition of embodiment 55 which is essentially free of Portland cement.

57. The composition of any one of embodiments 46 to 56 wherein the compositions are in the form of on-site concretes, pre-cast concrete parts, concrete wares, cast concrete stones, in-situ concretes, air-placed concretes, ready-mixed concretes, construction adhesives, adhesives for thermal insulation composite systems, concrete repair systems, one-component and two-component sealing slurries, screeds, filling and levelling compounds, tile adhesives, renders, adhesives, sealants, coating systems, for example for tunnels, wastewater channels, splash protection and condensate lines, dry mortars, joint grouts, drainage mortars or repair mortars.

58. The use of a copolymer of any one of embodiments 1 to 45 or of a composition of any one of embodiments 46 to 57 as a dispersing agent for inorganic binders.

"Structural units" as used herein denotes repeating units constituting the backbone of the copolymer.

"Free polyether side chains" are linear or branched, preferably linear, polyether chains that are bound at one of their ends to the copolymer backbone, the other end(s) being free, i.e. not bound to the copolymer backbone. It will be appreciated that crosslinking moieties incorporating polyether chains are not encompassed by this definition.

The copolymer of the invention is preferably uncrosslinked, i.e., it is prepared in the essential absence of polyethylenically unsaturated monomers.

The term "alkyl" as used herein alone or together with other atoms or groups such alkoxy etc. means an alkyl group having the indicated number of carbon atoms. Examples for alkyl are methyl, ethyl, propyl, n-butyl group, isobutyl etc.

The term "alkylene" as used herein alone or together with other atoms or groups such as oxyalkylene etc. means a divalent alkyl group having the indicated number of carbon atoms. Examples for alkylene are methylene, ethylene, 1,2-propylene, 1,3-propylene, 1,4-butylene, 1,2-butylene etc.

In one embodiment, AO in the above formulae represents one sort of oxyalkylene groups. In another embodiment, AO represents two or more sorts of oxyalkylene groups. Different sorts of oxyalkylene groups may be arranged in random, block or alternate manner. Examples for oxyalkylene groups are selected from oxyethylene, oxypropylene, oxybutylene groups. In a preferred embodiment, AO represents an oxyalkylene group with 2 to 4 carbon atoms, e.g. oxyethylene, oxy-propylene or oxybutylene. In a more preferred embodiment AO represents an oxyethylene group.

The prefix "(meth)" as used herein in chemical names such as "(meth)acrylate", "(meth)acrylic acid", "(meth)acrylic amide" or "(meth)allyl alcohol" means that said chemical names comprise both, the acrylic and methacrylic compounds or the allyl and methallyl compounds, respectively.

The structural units according to general formula (I) may for example be derived from monomers such as salicylic acid-4-maleamide, salicylic acid-4-(meth)acrylamide, salicylic acid-4-maleate, salicylic acid-4-(meth)acrylate or mixtures thereof. The monomers can be prepared by reacting maleic anhydride with 4-aminosalicylic acid or 4-hydroxysalicylic acid or by by reacting (meth)acrylic anhydride with 4-aminosalicylic acid or 4-hydroxysalicylic acid.

The structural units according to general formula (I) may also be derived from monomers such as salicylic acid-4-allyl ether or salicylic acid-4-isoprenyl ether. These monomers are accessible e.g. by etherifying one hydroxyl group of dihydroxybenzoic acid allyl, methallyl or isoprenylchloride in a conventional manner.

The structural units according to general formula (II) may for example be derived from monomers obtainable by esterifying polyalkylene glycols or $C_1$-$C_4$-alkoxypolyalkylene glycols, wherein the alkylene groups have 2 to 5 carbon atoms, with ethylenically unsaturated carboxylic acids, such as (meth)acrylic acid, maleic acid, crotonic acid or mixtures thereof. Said $C_1$-$C_4$-alkoxypolyalkylene glycols can be obtained by etherifying the polyalkylene glycol with saturated aliphatic alcohols with 1 to 4 carbon atoms, such as methanol, ethanol, 1-propanol, 2-propanol, 1-butanol, 2-butanol, etc. or mixtures thereof, with alkylene oxides with 2 to 5 carbon atoms.

The structural units (11) may also be derived from monomers which are obtained by adding $C_2$-$C_5$-alkylene oxides to unsaturated alcohols such as (meth)allylalcohol, 3-methyl-3-butene-1-ol, 3-methyl-2-butene-1-ol, 2-methyl-3-butene-2-ol, 2-methyl-2-butene-1-ol, or 2-methyl-3-butene-1-ol. One or 2 or more sorts of $C_2$-$C_5$-alkylene oxides such as ethylene oxide, propylene oxide or butylene oxide, may be used for the preparation of above-mentioned monomers. When 2 or more sorts are used, random addition, block addition or alternate addition of the different alkylene oxides may be conducted.

In a preferred embodiment the structural units according to formula (I) are derived from monomers such as vinyloxy-butyl-polyethyleneglycol, methoxy polyethyleneglycol (meth)acrylate, (meth)allyl polyethylene glycol ether, vinyl polyethyleneglycol ether, isoprenyl polyethyleneglycol ether or mixtures thereof.

The copolymer of the invention may further comprise structural units derived from copolymerizable monomers (A1) selected from the group consisting of (meth)acrylamide, N,N-mono- and di-$C_1$-$C_4$-alkyl(meth)acrylamides, 2-(meth)acrylamido-$C_2$-$C_6$-alkyl sulfonic acids, (meth)

acrylnitrile, N-vinylderivatives of cyclic lactames, N,N-mono- and di-$C_1$-$C_4$-alkylaminoalkyl(meth)acrylates.

Among the monomers (A1) acrylamide, methacrylamide, acryl nitrile, methacryl nitrile, 2-acrylamido-2-methylpropane sulfonic acid, vinyl pyrrolidone, and mixtures thereof are preferred.

The copolymer of the invention may further comprise structural units derived from copolymerizable monomers (A2) selected from the group consisting of vinylaromatic compounds, vinyl- or allyl esters of $C_1$-$C_{12}$ carboxylic acids, esters of $\alpha,\beta$-ethylenically unsaturated $C_3$-$C_6$ monocarboxylic acids or $C_4$-$C_8$ dicarboxylic acids with $C_1$-$C_{12}$ alkanoles.

Examples for vinylaromatic compounds are styrene, carboxylated or sulfonated styrene, $\alpha$-methyl styrene or vinyl toluenes, such as o-vinyl toluene.

Suitable vinyl- or allylesters of $C_1$-$C_{12}$ carboxylic acids are vinyl acetate, vinyl propionate, vinyl-n-butyrate, vinyl laurate and vinyl stearate or allyl acetate, allyl propionate, allyl-n-butyrate, allyl laurate and allyl stearate.

In a preferred embodiment monomers (A2) are selected from methyl acrylate, ethyl acrylate, 1-methylethyl acrylate, n-butyl acrylate, tert.-butyl acrylate, 2-ethylhexyl acrylate, methyl methacrylate, tert.-butyl methacrylate, styrene, carboxylated or sulfonated styrene, $\alpha$-methyl styrene, vinyl toluene, vinyl acetate, vinyl propionate, ethylvinylether and mixtures thereof.

The units derived from monomer A1, A2 and/or A3 relative to the total molar amounts of structural units (I) and (II) and optionally (III) is in the range of 0.01:1 to 0.1:1.

The copolymers of the invention can be prepared according to conventional methods. They are generally prepared by free-radical polymerization in solution, preferably in polar solvents and especially in water, see for example H. G. Elias, Makromoleklle, Wiley-VCH, 2002. To establish the desired molecular weight, it is possible to add substances, which regulate the molecular weight. Examples for suitable molecular weight regulators are water-soluble compounds containing a thiol group (e.g. 2-mercapto ethanol, mercapto propionic acid), allyl alcohol and aldehydes, such as formaldehyde, acetaldehyde, etc.

Examples for suitable initiators for radical polymerization reactions are hydrogen peroxide, inorganic peroxides, such as sodium peroxodisulfate, water-soluble azo compounds, or redox initiators, such as iron(II)/peroxide systems.

A copolymer solution, in particular an aqueous solution, is obtained after the polymerization reaction.

The copolymer solution may optionally be dried in a customary manner, for example by freeze drying or, preferably, by spray drying. In the case of spray drying, a procedure is used in which the stream of hot air enters at from 100 to 200° C., preferably from 120 to 160° C., and exits at from 30 to 90° C., preferably from 60 to 80° C. Spraying the aqueous copolymer solution in the stream of hot air can be effected, for example, by means of single-substance or multi-substance nozzles or by using a rotating disk. The polymer powders are normally separated off using cyclones or filter separators. The aqueous copolymer solution and the stream of hot air are preferably conducted in parallel.

Spray drying aids, such as polyvinyl alcohol, polyvinyl pyrrolidone, naphthalene sulfonic acid-formaldehyde condensates, phenolsulfonic acid-formaldehyde condensates, benzenesulfonic acid-formaldehyde condensates, or homopolymers of 2-acrylamido-2-methylpropanesulfonic acid, may additionally be added to the copolymer solution before drying or sprayed separately into the stream of hot air.

Further, anticaking agents, such as highly disperse silica or talkum, may be employed in order to prevent the polymer powder caking together in the course of storage.

In one embodiment the copolymer of the invention has an average molecular weight $M_w$ of from 10.000 to 100.000 g/mol, preferably 15.000 to 50.000 g/mol. The molecular weight of the copolymer of the invention is determined by GPC (gel permeation chromatography), using polyhydroxymethacrylate (poly(hydroxyethylmethacrylate)) columns such as columns of the OH-Pak SB series which are available from Shodex, Japan with poly(styrenesulfonate) standard and UV detection at a wavelength of 254 nm.

The present invention further provides the use of the copolymers of the invention as a dispersant for inorganic binder systems, in particular geopolymer binder systems which preferably have a reduced content of Portland cement. The present invention further relates to a construction chemical composition comprising at least one copolymer of the invention as described above. In one embodiment, the construction chemical composition comprises at least one copolymer as described above in an amount of from 0.1 to 3 wt.-%, based on the total weight of the composition.

According to a further embodiment, the construction chemical composition comprises an inorganic binder which may be selected from cement, in particular Portland cement, and geopolymer binders.

The geopolymer binder may be selected from latent hydraulic binders, pozzolanic binders and/or alkali-activated aluminosilicate binders, and mixtures thereof.

The latent hydraulic binders may be selected from industrial or synthetic slags, for example blast furnace slag, slag sand, ground slag sand, electrothermic phosphorus slag, steel slag, and mixtures thereof, and the pozzolanic binders may be selected from amorphous silica, for example precipitated silica, pyrogenic silica and microsilica, finely ground glass, fly ash, for example brown-coal fly ash or mineral coal fly ash, metakaolin, natural pozzolanas such as tuff, trass and volcanic ash, natural and synthetic zeolites, and mixtures thereof.

Aluminate cement ("high-alumina cement") comprises about 20% to 40% by weight CaO, up to about 5% by weight $SiO_2$, about 40% to 80% by weight $Al_2O_3$ and up to about 20% by weight $Fe_2O_3$.

The slags may be both industrial slags, i.e. waste products from industrial processes, and synthetically reproduced slags. The latter slags provide the advantage that they are always available in consistent quantity and quality.

A latent hydraulic binder may be a binder in which the molar ratio of (CaO+MgO):$SiO_2$ of between 0.8 and 2.5, preferably between 1.0 and 2.0.

Blast furnace slag, a typical latent hydraulic binder, generally comprises 30% to 45% by weight CaO, about 4% to 17% by weight MgO, about 30% to 45% by weight $SiO_2$ and about 5% to 15% by weight $Al_2O_3$, for example about 40% by weight CaO, about 10% by weight MgO, about 35% by weight $SiO_2$ and about 12% by weight $Al_2O_3$. The cured products generally have the properties of hydraulically cured systems.

"Blast furnace slag" is a waste product of the blast furnace process. "Slag sand" is granulated blast furnace slag, and "ground granulated blast furnace slag" is finely pulverized slag sand. The ground slag sand varies, according to origin and processing form, in its particle size and grain-size distribution, with the particle size affecting the reactivity. As a characteristic variable for the particle size, the figure known as the Blaine value is employed, which is typically in the order of magnitude of 200 to 1000, preferably between 300 and 500 m² kg⁻¹.

Electrothermic phosphorus slag is a waste product from the production of phosphorus by electrothermic means. It is less reactive than blast furnace slag and comprises about 45% to 50% by weight CaO, about 0.5% to 3% by weight MgO, about 38% to 43% by weight $SiO_2$, about 2% to 5% by weight $Al_2O_3$ and about 0.2% to 3% by weight $Fe_2O_3$, and also fluoride and phosphate. Steel slag is a waste product from various steel manufacturing processes, with a highly varying composition (see Caijun Shi, Pavel V. Krivenko, Della Roy, Alkali-Activated Cements and Concretes, Taylor & Francis, London & New York, 2006, pp. 42-51).

Amorphous silica is preferably a X-ray-amorphous silica, i.e. a silica which exhibits no crystallinity in a powder diffraction procedure. The amorphous silica for example comprises $SiO_2$ in an amount of at least 80% by weight, preferably at least 90% by weight. Precipitated silica is obtained industrially via precipitation processes starting from waterglass. Depending on the manufacturing method, precipitated silica is also called silica gel. Pyrogenic silica is generated by reacting chlorosilanes, such as silicon tetrachloride, in an oxyhydrogen flame. Pyrogenic silica is an amorphous $SiO_2$ powder with a particle diameter of 5 to 50 nm and a specific surface area of 50 to 600 m² g⁻¹.

Microsilica is a by-product of silicon or ferrosilicon manufacture and comprises amorphous $SiO_2$ powder. The particles have diameters of about 0.1 μm. The specific surface area is about 15 to 30 m²g⁻¹. In contrast, commercial silica sand is crystalline and has comparatively larger particles and a comparatively lower specific surface area.

Fly ashes are for example formed in operations including the combustion of coal in power stations. Class C fly ash (brown coal fly ash) comprises, according to WO 08/012438, about 10% by weight CaO, whereas class F fly ash (mineral coal fly ash) comprises less than 8% by weight, preferably less than 4% by weight, and typically about 2% by weight, CaO.

Metakaolin may be formed in the dehydrogenation reaction of kaolin. Kaolin releases bound water at 100 to 200° C., dehydroxylation occurs at 500 to 800° C., with collapse of the lattice structure and formation of metakaolin ($Al_2Si_2O_7$). Pure metakaolin, accordingly, comprises about 54% by weight $SiO_2$ and about 46% by weight $Al_2O_3$.

Further pozzolanic binders are for example shown in Caijun Shi, Pavel V. Krivenko, Della Roy, Alkali-Activated Cements and Concretes, Taylor & Francis, London & New York, 2006, pp. 51-63. Testing for pozzolan activity can take place in accordance with DIN EN 196 Part 5.

The above-mentioned alkali-activated aluminosilicate binders may comprise latent hydraulic and/or pozzolanic binders as defined above and also alkaline activators, such as aqueous solutions of alkali metal carbonates, alkali metal fluorides, alkali metal hydroxides, alkali metal aluminates and/or alkali metal silicates, such as soluble waterglass.

The alkali silicate may be selected from compounds with the empirical formula m $SiO_2$-n $M_2O$, wherein M represents Li, Na, K and $NH_4$, and mixtures thereof, preferably Na and K. The molar ratio m:n may be about 0.5 to 4.0, preferably 0.6 to 3.0, particularly 0.7 to 2.5. The alkali metal silicate may be selected from waterglass, preferably a liquid waterglass, particularly a sodium or potassium waterglass. Lithium or ammonium waterglasses, and mixtures of the above-mentioned waterglasses may also be used. The solids contents of the aqueous waterglass solutions are for example in arrange of from 20% by weight to 60% by weight, preferably 30% to 50% by weight.

In one embodiment said construction chemical composition may comprise a geopolymer binder and Portland cement. The Portland cement is preferably present in an amount of less than 50 wt.-%, preferably less than 40 wt.-%, in particular less than 30 wt.-%, based on the total weight of the geopolymer binder. In a further embodiment said construction chemical composition is essentially free of Portland cement. "Essentially free" means that not more than 20 wt.-%, preferably not more than 10 wt.-%, more preferably not more than 1 wt.-%, in particular 0 wt.-%, of Portland cement, based on the total weight of the geopolymer binder, is present.

In another embodiment the construction chemical composition comprises at least one copolymer as described above in an amount of from 0.1 to 3 wt.-%, based on the total weight of the composition, an inorganic binder, in particular a geopolymer binder, in an amount of from 24.9 to 36 wt.-%, based on the total weight of the composition and sand in an amount of from 61 to 75 wt.-%, based on the total weight of the composition, wherein the weight percentages of all components add up to 100 wt.-%.

In an embodiment, this composition is essentially free of Portland cement.

In one embodiment the construction chemical composition additionally comprises additives selected from the group consisting of $Na_2CO_3$, KOH and $Na_2SiO_3$. Said additives may be contained in the composition in an amount of from 0.1 to 5 wt.-%, preferably 0.5 to 3 wt.-%, based on the total weight of the composition.

The construction chemical compositions may additionally contain additives such as glycols, polyalcohols, aminoalcohols, organic acids such as citric acid or tartaric acid, sugar, melasses, organic and inorganic salts, polycarboxylate ethers (which are different from the copolymers of the invention), naphthalin sulfonate, melamineformaldehyde polycondensates, lignin sulfonate, as well as mixtures thereof. Further suitable additives are defoamers, water retention agents, pigments, fibers, dispersion powders, wetting agents, retarders, hardening accelerators, such as calcium silicate hydrate, complex forming agents, aqueous dispersions and rheology modifiers.

Said construction chemical compositions may be present in a form which is selected from on-site concrete, pre-cast concrete parts, concrete ware, cast concrete stones and also in-situ concrete, air-placed concrete, ready-mixed concrete, construction adhesives and adhesives for thermal insulation composite systems, concrete repair systems, one-component and two-component sealing slurries, screeds, filling and levelling compounds, tile adhesives, renders, adhesives and sealants, coating systems, for example for tunnels, wastewater channels, splash protection and condensate lines, dry mortars, joint grouts, drainage mortars or repair mortars.

The copolymers of the invention advantageously provide an effective plasticizing action (water-reducing capability) to inorganic binder systems. They allow for a reduction of the water content in said systems without reducing the fluidity and processability of the composition. It is believed that this effect is based on the incorporation of salicylic acid moieties into the copolymer.

The present invention further relates to the use of the copolymers as described above as a plasticizer for inorganic binders, in particular geopolymer binders.

The following examples are intended to illustrate the invention without limiting it.

In the examples $M_w$ was determined by GPC using a column combination of OH-Pak SB-G, OH-Pak SB 804 HQ and OH-Pak SB 802.5 HQ commercially obtainable from Shodex, Japan. Eluent: 80 vol.-% aqueous solution of $HCO_2NH_4$ (0.05 mol/l) and 20 vol.-% acetonitrile; injection volume 100 µl; flow rate 0.5 ml/min; calibration with poly(styrene sulfonate) obtained from PSS Polymer Standards Service, Germany; UV detection at 254 nm.

EXAMPLE 1 (E1)

Reaction of 4-Aminosalicylic Acid with Maleic Anhydride to Salicylic Acid-4-Maleimide

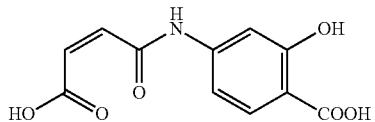 [SMILES: O=C(O)/C=C\C(=O)Nc1ccc(C(=O)O)c(O)c1]

A reaction vessel with a stirrer and a pH-electrode was charged with 306 g (2 mol) 4-aminosalicylic acid and 1350 g of water to obtain a suspension. NaOH was added in order to adjust the pH-value to 6.5 resulting in a brownish solution.

In a separate vessel 235 g (2.4 mol) maleic anhydride was dissolved in 450 ml acetone. Said solution was added dropwise to the reaction vessel over a time period of three hours. Simultaneously the pH-value of the reaction solution was kept in a range of 5.5-6.5 by continuous addition of a 50% NaOH-solution. After the addition of the maleic anhydride solution was completed, the resulting mixture was stirred at room temperature for two hours. Then the solution was stored in a refrigerator to crystallize salicylic acid-4-maleimide. After filtration 400 g of salicylic acid-4-maleimide were obtained.

EXAMPLE 2 (E2)

Reaction of 4-Aminosalicylic Acid with Methacrylic Acid Anhydride to Salicylic Acid-4-Methacrylic Amide

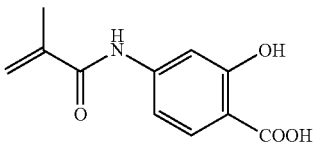 [SMILES: C=C(C)C(=O)Nc1ccc(C(=O)O)c(O)c1]

In a reaction vessel with a stirrer, a dropping funnel and a drying tube 153 g (1 mol) of 4-aminosalicylic acid were dissolved in 1228 g of anhydrous acetone. To this solution 164 g (1 mol) methacrylic acid anhydride were added dropwise over a time period of one hour. After complete addition the resulting mixture was stirred for 20 min at room temperature. Then 101 g (1 mol) triethylamine were added via the dropping funnel over a time period of 1 hour. After complete addition the resulting mixture was stirred for three hours at room temperature. 900 mL of acetone were removed under reduced pressure and the resulting residue was diluted with water (200 mL). The obtained solution showed a pH-value of about 5. By adding sulfuric acid (25%) the pH-value was adjusted to 2-3, resulting in the precipitation of fine white precipitate. After filtration and washing with cold water 210 g of salicylic acid-4-methacrylic amide were obtained.

EXAMPLE 3 (E3)

A double-jacketed reaction vessel with a stirrer, a thermometer and a pH-electrode was charged at room temperature with a solution of 75 g vinyloxybutyl-polyethyleneglycol (V-PEG, molecular weight=500 g/mol) and 60 ml of water. The reaction vessel was additionally charged with 900 mg of 3-mercaptopropionic acid.

In a separate vessel 48 g of salicylic acid-4-maleimide (Example 1) were dissolved in water (150 mL) under addition of 20% NaOH (13 mL). Said solution was added to the reaction vessel under vigorous stirring and cooling. The temperature was kept below 15° C.; the pH-value was kept in a range of 4.8 to 5.2 (if necessary, the pH-value may be adjusted by adding 20% sulfuric acid or NaOH-solution).

Then 45 mg iron-(II)-sulfate and 2.8 g of a 30% hydrogen peroxide solution were added. Further, a solution of Rongalit (sodium hydroxymethylsulfinate, product of BASF SE, 2.5 g) in water (47.5 mL), which was also prepared in a separate vessel, was pumped into the reaction vessel (dosing rate=4.6 mL/h). After complete addition of the Rongalit-solution the polymerization was complete. In the case peroxide may still be detectable in the solution, it can be decomposed by further addition of Rongalit.

The obtained polymer solution was neutralized to pH 7. The resulting polymer had an average molecular weight Mw of 22280 g/mol.

EXAMPLE 4 (E4)

A double-jacketed reaction vessel with a stirrer, a thermometer and a pH-electrode was charged with a solution of 150 g vinyloxybutyl-polyethyleneglycol (V-PEG, molecular weight=1100 g/mol) and 120 ml of water at room temperature. The reaction vessel was additionally charged with 2.1 mg of 3-mercaptopropionic acid.

In a separate vessel 59 g of salicylic acid-4-maleimide (Example 1) were dissolved in water (180 mL) under addition of 20% NaOH (13 mL). Said solution was added to the reaction vessel under vigorous stirring and cooling. The temperature was kept below 15° C.; the pH-value was kept in a range of 4.8 to 5.2. (if necessary, the pH-value may be adjusted by adding 20% sulfuric acid or NaOH-solution).

Then 62 mg iron-(II)-sulfate and 3.8 g of a 30% peroxide solution were added. Further, a solution of Rongalit (sodium hydroxymethylsulfinate, product of BASF SE, 2.5 g) in water (47.5 mL), which was also prepared in a separate vessel, was pumped into the reaction vessel (dosing rate=14.3 mL/h). After complete addition of the Rongalit-solution the polymerization was complete. In the case peroxide may still be detectable in the solution, it can be decomposed by further addition of Rongalit.

The obtained polymer solution was neutralized to pH 7. The resulting polymer had an average molecular weight Mw of 22500 g/mol.

EXAMPLE 5 (E5)

A double-jacketed reaction vessel with a stirrer, a thermometer and a pH-electrode was charged with a solution of 28.5 g of ω-methylpolyethyleneglycol methacrylic acid ester (M PEG-MA, molecular weight=950 g/mol) and water (28.5 ml) at room temperature. The reaction vessel was additionally charged with 0.24 g 2-mercaptoethanol.

In a separate vessel 36 g of sodium carbonate and 20 g of salicylic acid-4-methacrylicamide (Example 2) were dissolved in water (144 g) (solution 1). In another separate vessel 484 mg of azo initiator V044 (2,2'-Azobis[2-(2-imidazolin-2-yl)propane]dihydrochloride) were dissolved in 27 g of water (solution 2).

Under stirring and purging with nitrogen the mixture in the reaction vessel was heated to 90° C. When 90° C. were reached, solution 1 (dosing rate=66.7 ml/h) and solution 2 (dosing rate=7.5 ml/h) were simultaneously added. After complete addition of solutions 1 and 2, the resulting mixture was stirred for one hour at 90° C.

The resulting polymer solution was neutralized to pH 8. The polymer had an average molecular weight Mw of 24300 g/mol.

EXAMPLE 6 (E6)

A double-jacketed reaction vessel with a stirrer, a thermometer and a pH-electrode was charged with a solution of 68.4 g of w-methylpolyethyleneglycol methacrylic acid ester (M PEG-MA, molecular weight=950 g/mol) and water (75 ml) at room temperature. The reaction vessel was additionally charged with 0.67 g 2-mercaptoethanol.

In a separate vessel 48 g of sodium carbonate, 26.5 g of salicylic acid-4-methacrylicamide (Example 2) and 17 g methacrylic acid were dissolved in water (190 g) (solution 1). In another separate vessel 1.36 g of azo initiator V044 (2,2'-Azobis[2-(2-imidazolin-2-yl)propane]dihydrochloride) were dissolved in 36 g of water (solution 2).

Under stirring and purging with nitrogen the mixture in the reaction vessel was heated to 90° C. When 90° C. were reached, solution 1 (dosing rate=94 ml/h) and solution 2 (dosing rate=12 ml/h) were simultaneously added. After complete addition of solutions 1 and 2, the resulting mixture was stirred for one hour at 90° C.

The resulting polymer solution was neutralized to pH 8. The polymer had an average molecular weight Mw of 22200 g/mol.

EXAMPLE 7 (E7)

A double-jacketed reaction vessel with a stirrer, a thermometer and a pH-electrode was charged with a solution of 68.4 g of w-methylpolyethyleneglycol methacrylic acid ester (M PEG-MA, molecular weight=950 g/mol) and water (75 ml) at room temperature. The reaction vessel was additionally charged with 0.65 g 2-mercaptoethanol.

In a separate vessel 48 g of sodium carbonate, 26.5 g of salicylic acid-4-methacrylicamide (Example 2) and 35 g hydroethylmethacrylate phosphoric acid ester were dissolved in water (190 g) (solution 1). In another separate vessel 1.36 g of azo initiator V044 (2,2'-Azobis[2-(2-imidazolin-2-yl)propane]dihydrochloride) were dissolved in 36 g of water (solution 2).

Under stirring and purging with nitrogen the mixture in the reaction vessel was heated to 90° C. When 90° C. were reached, solution 1 (dosing rate=100 ml/h) and solution 2 (dosing rate=12 ml/h) were simultaneously added. After complete addition of solutions 1 and 2, the resulting mixture was stirred for one hour at 90° C.

The resulting polymer solution was neutralized to pH 8. The polymer had an average molecular weight Mw of 21500 g/mol.

COMPARATIVE EXAMPLE 1 (C1)

A double-jacketed reaction vessel with a stirrer, a thermometer and a pH-electrode was charged with a solution of 68.4 g of w-methylpolyethyleneglycol methacrylic acid ester (M PEG-MA, molecular weight=950 g/mol) and water (75 ml) at room temperature. The reaction vessel was additionally charged with 0.65 g 2-mercaptoethanol.

In a separate vessel 20.3 g methacrylic acid were dissolved in water (20 g) (solution 1). In another separate vessel 0.55 g of azo initiator V044 (2,2'-Azobis[2-(2-imidazolin-2-yl)propane]dihydrochloride) were dissolved in 20 g of water (solution 2).

Under stirring and purging with nitrogen the mixture in the reaction vessel was heated to 90° C. When 90° C. were reached, solution 1 (dosing rate=10 ml/h) and solution 2 (dosing rate=6.7 ml/h) were simultaneously added. After complete addition of solutions 1 and 2, the resulting mixture was stirred for one hour at 90° C.

The resulting polymer solution was neutralized to pH 8. The polymer had an average molecular weight Mw of 26300 g/mol.

Application Tests

In the following tests the mortar plasticization (spread) of geopolymer binder systems containing copolymers of the invention and comparative systems was tested. Aluminosilicate mortars were produced using a mortar mixer according to DIN EN 196-1. All ingredients were mixed according DIN EN 196-1, except that the quartz sand was added before mixing, instead of adding it at the end of the mixing process. The mortar spread was measured by means of a Haegermann cone after 15 times knocking on a spread table (DIN EN 1015-3). Blast furnace slag as contained in the binder systems was composed as follows (amounts given in wt. %):

|  | CaO | $SiO_2$ | $Al_2O_3$ | MgO | $Fe_2O_3$ | $TiO_2$ | $K_2O$ | Rest |
|---|---|---|---|---|---|---|---|---|
| Slag | 42.8 | 34.7 | 11.4 | 5.3 | 0.7 | 1.2 | 0.6 | 3.3 |

All tested copolymers were formulated with 4 wt.-% defoamer Dowfax DF 141 (nonionic defoamer comprising a copolymer of ethylene oxide, propylene oxide and/or butylene oxide), relative to the polymer. The polymer dosage was 1 wt.-%, relative to the geopolymer binder.

Application Test 1

The following geopolymer binder system was prepared:

| Slag | 300 g |
|---|---|
| Quartz sand | 700 g |
| KOH | 12 g |
| $Na_2CO_3$ | 12 g |
| Copolymer | 3 g |

The water/slag ratio was 0.53. The spread values are given in Table 1. Spreads after 6 min and 30 min are given in cm. The sample numbers refer to the Examples above.

TABLE 1

| Sample | No copolymer added | E3 | E4 | E5 | E6 | E7 | C1 |
|---|---|---|---|---|---|---|---|
| Spread after 6 min | 15.7 | 20.3 | 16.7 | 19.2 | 18.7 | 19.0 | 15.9 |
| Spread after 30 min | 15.4 | 19.6 | 16.1 | 18.5 | 18.5 | 19.0 | 15.2 |

Application Test 2

The following geopolymer binder system was prepared:

| | |
|---|---|
| Slag | 300 g |
| Quartz sand | 700 g |
| Na$_2$CO$_3$ | 6 g |
| Copolymer | 3 g |

The water/slag ratio was 0.583. The spread values are given in Table 2. Spreads after 6 min and 30 min are given in cm. The sample numbers refer to the Examples above.

TABLE 2

| Sample | No copolymer added | E3 | E4 | E5 | E6 | E7 | C1 |
|---|---|---|---|---|---|---|---|
| Spread after 6 min | 14.0 | 15.4 | 16.4 | 16.6 | 17.5 | 17.7 | 14.3 |
| Spread after 30 min | 13.7 | 15.4 | 16.1 | 16.4 | 17.6 | 18.0 | 14.1 |

Application Test 3

The following geopolymer binder system was prepared:

| | |
|---|---|
| Slag | 300 g |
| Quartz sand | 700 g |
| Na$_2$SiO$_3$ | 6 g |
| Copolymer | 3 g |

The water/slag ratio was 0.583. The spread values are given in Table 3 herein below (two parts). Spreads after 6 min and 30 min are given in cm. The sample numbers refer to the Examples above.

TABLE 3

| Sample | No copolymer added | E3 | E4 | E5 | E6 | E7 | C1 |
|---|---|---|---|---|---|---|---|
| Spread after 6 min | 14.5 | 15.9 | 16.6 | 15.9 | 16.4 | 16.8 | 14.5 |
| Spread after 30 min | 14.2 | 15.5 | 15.9 | 15.0 | 16.6 | 17.0 | 14.3 |

Application tests 1 to 3 show that Samples E3 to E7 show a better spread (this corresponds to a better plasticization) of the used binder systems as compared to samples without a copolymer of the invention or samples containing a copolymer without salicylic acid moieties. The addition of additives such as Na$_2$CO$_3$, KOH or Na$_2$SiO$_3$ seems not to have a significant influence on the spread.

The invention claimed is:

1. A copolymer comprising structural units of formula (I)

(I)

[Structure showing: backbone with R$^{31}$, R$^{30}$ on one carbon and R$^{32}$, (C$_n$H$_{2n}$)$_x$—(CO)$_y$—(X)$_z$— connected to a phenyl ring bearing COOM, OH, and (R$^{33}$)$_t$ substituents]

wherein
R$^{30}$, R$^{31}$ and R$^{32}$ independently of each other represent a hydrogen atom, an alkyl group with 1 to 6 carbon atoms or COOM;

X is NH, N(C$_1$-C$_4$ alkyl) or O;
R$^{33}$ is OH, NR$^{34}$R$^{35}$, COOM, COOR$^{34}$, SO$_3$M, SO$_3$R$^{34}$, NO$_2$, C$_1$-C$_6$ alkoxy or C$_1$-C$_6$ alkyl;
R$^{34}$ and R$^{35}$ independently of each other represent H, C$_1$-C$_6$ alkyl, phenyl, C$_1$-C$_6$ alkyl-phenyl or phenyl-C$_1$-C$_6$ alkyl;
t is 0, 1, 2, or 3;
x is 0 or 1;
n is 1, 2 or 3;
y is 0 or 1;
z is 0 or 1; and
M is H or a cation equivalent; and
structural units having free polyether side chains, wherein the structural units having free polyether side chains are selected from units of the formulae (IIa), (IIb), (IIc) and/or (IId):

(IIa):

[Structure: —(C(R$^{10}$)(R$^{12}$)—C(R$^{11}$)(C$_n$H$_{2n}$—Z—E—G—(AO)$_a$—R$^{13}$))—]

wherein
R$^{10}$, R$^{11}$ and R$^{12}$ independently of one another are H or an unbranched or branched C$_1$-C$_4$ alkyl group;
Z is O or S;
E is an unbranched or branched C$_1$-C$_6$ alkylene group, a cyclohexylene group, CH$_2$—C$_6$H$_{10}$ (—CH$_2$-cyclohexyl-), 1,2-phenylene, 1,3-phenylene or 1,4-phenylene;
G is O, NH or CO—NH; or
E and G together are a chemical bond;
A is C$_x$H$_{2x}$ with x=2, 3, 4 or 5, or is CH$_2$CH(C$_6$H$_5$);
n is 0, 1, 2, 3, 4 or 5;
a is an integer from 2 to 350;
R$^{13}$ is H, an unbranched or branched C$_1$-C$_4$ alkyl group, CO—NH$_2$ and/or COCH$_3$;

(IIb):

[Structure: —(C(R$^{16}$)(R$^{18}$)—C(R$^{17}$)(C$_n$H$_{2n}$—O—E—N((LO)$_d$—R$^{20}$)—(AO)$_a$—R$^{19}$))—]

in which
R$^{16}$, R$^{17}$ and R$^{18}$ independently of one another are H or an unbranched or branched C$_1$-C$_4$ alkyl group;
E is an unbranched or branched C$_1$-C$_6$ alkylene group, a cyclohexylene group, CH$_2$—C$_6$H$_{10}$ (—CH$_2$-cyclohexyl-), 1,2-phenylene, 1,3-phenylene, or 1,4-phenylene, or is a chemical bond;
A is C$_x$H$_{2x}$ with x=2, 3, 4 or 5, or is CH$_2$—CH(C$_6$H$_5$);
n is 0, 1, 2, 3, 4 and/or 5;
L is C$_x$H$_{2x}$ with x=2, 3, 4 or 5, or is CH$_2$—CH(C$_6$H$_5$);
a is an integer from 2 to 350;
d is an integer from 1 to 350;
R$^{19}$ is H or an unbranched or branched C$_1$-C$_4$ alkyl group;
R$^{20}$ is H or an unbranched or branched C$_1$-C$_4$ alkyl group;

(IIc):

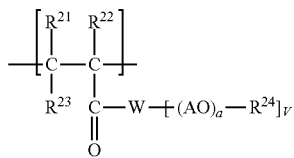

in which
R$^{21}$, R$^{22}$ and R$^{23}$ independently of one another are H or an unbranched or branched C$_1$-C$_4$ alkyl group or COOM;
W is O, NR$^{25}$, or is N;
V is 1 if W=O or NR$^{25}$, and is 2 if W=N;
A is C$_x$H$_{2x}$ with x=2, 3, 4 or 5, or is CH$_2$—CH(C$_6$H$_5$);
a is an integer from 2 to 350;
R$^{24}$ is H or an unbranched or branched C$_1$-C$_4$ alkyl group; and
R$^{25}$ is H or an unbranched or branched C$_1$-C$_4$ alkyl group;
(IId):

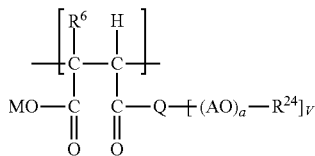

in which
R$^6$ is H or an unbranched or branched C$_1$-C$_4$ alkyl group,
Q is NR$^{10}$, N or O,
V is 1 if Q=O or NR$^{10}$ and is 2 if Q=N;
R$^{10}$ is H or an unbranched or branched C$_1$-C$_4$ alkyl group; and
A is C$_x$H$_{2x}$ with x=2, 3, 4 or 5, or is CH$_2$CH(C$_6$H$_5$);
R$^{24}$ is H or an unbranched or branched C$_1$-C$_4$ alkyl group;
M is H or a cation equivalent; and
a is an integer from 2 to 350.

2. The copolymer according to claim 1, wherein t is 0.

3. The copolymer according to claim 2, comprising structural units of formula (Ib)

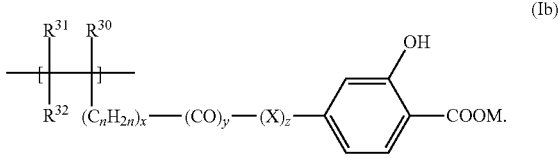

4. The copolymer according to claim 1, wherein R$^{30}$ is H or CH$_3$, R$^{31}$ is H, R$^{32}$ is H or COOM, x is 0, y is 1, and z is 1.

5. The copolymer according to claim 1, wherein R$^{30}$ is H or CH$_3$, R$^{31}$ and R$^{32}$ are H, x is 0, 1 or 2, y is 0 and z is 1.

6. The copolymer according to claim 1, wherein the copolymer comprises:
structural units (IIa), wherein:
a) Z is O and E and G together are a chemical bond, R$^{10}$ and R$^{12}$ are H, R$^{11}$ is H or CH$_3$, n is 1 or 2 and R$^{13}$ is H or an unbranched or branched C$_1$-C$_4$ alkyl group; or
b) Z is O, E is an unbranched or branched C$_1$-C$_6$ alkylene group, G is O, R$^{10}$, R$^{11}$ and R$^{12}$ are H, n is 0 and R$^{13}$ is H or an unbranched or branched C$_1$-C$_4$ alkyl group; or
structural units (IIc), wherein W is O or NR$^{25}$.

7. The copolymer according to claim 6, wherein in structural units (IIc) R$^{21}$ and R$^{23}$ are H, R$^{22}$ is H or CH$_3$ and R$^{24}$ is H or an unbranched or branched C$_1$-C$_4$ alkyl group.

8. The copolymer according to claim 1, wherein the copolymer comprises structural units (IId), wherein R$^6$ is H, Q is O, and R$^{24}$ is H or an unbranched or branched C$_1$-C$_4$ alkyl group.

9. The copolymer according to claim 1, wherein a in formulae (IIa), (IIb), (IIc) and/or (IId) is 5 to 135.

10. The copolymer according to claim 1, additionally comprising structural units of the general formulae (IIIa), (IIIb), (IIIc) and/or (IIId):

(IIIa):

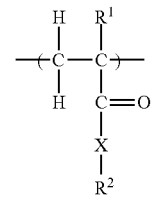

in which
R$^1$ is H or an unbranched or branched C$_1$-C$_4$ alkyl group, CH$_2$COOH or CH$_2$CO—X—R$^2$;
X is NH—(C$_n$H$_{2n}$), O(C$_n$H$_{2n}$) with n=1, 2, 3 or 4, where the nitrogen atom or the oxygen atom is bonded to the CO group, or is a chemical bond;
R$^2$ is OM, PO$_3$M$_2$, or O—PO$_3$M$_2$, with the proviso that X is a chemical bond if R$^2$ is OM;

(IIIb):

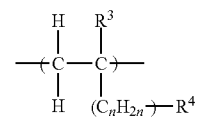

in which
R$^3$ is H or an unbranched or branched C$_1$-C$_4$ alkyl group;
n is 0, 1, 2, 3 or 4;
R$^4$ is PO$_3$M$_2$, or O—PO$_3$M$_2$;

(IIIc):

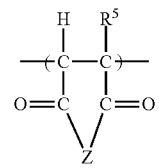

in which
R$^5$ is H or an unbranched or branched C$_1$-C$_4$ alkyl group;
Z is O or NR$^7$;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)—OPO$_3$M$_2$, and n is 1, 2, 3 or 4;

(IIId):

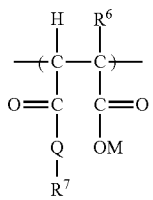

in which
R⁶ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4; and
each M in the formulae (IIIa) to (IIId) independently of one another is H or a cation equivalent.

11. A construction chemical composition comprising at least one copolymer according to claim 1 and an inorganic binder.

12. The composition of claim 11, wherein the inorganic binder is selected from hydraulic binders, latent hydraulic binders, puzzolanic binders, alkali-activated and alkali-activatable aluminosilicate binders, and mixtures thereof.

13. The composition of claim 12, wherein:
the hydraulic binders are selected from cements,
the latent hydraulic binders are selected from industrial slags, synthetic slags, and mixtures thereof,
the puzzolanic binders are selected from amorphous silica, pyrogenic silica, microsilica, glass powder, fly ash, and mixtures thereof.

14. A method of using the copolymer according to claim 1 as a dispersant for inorganic binders, the method comprising mixing the copolymer according to claim 1 with an inorganic binder.

15. The copolymer according to claim 2, comprising structural units of formula (Ic)

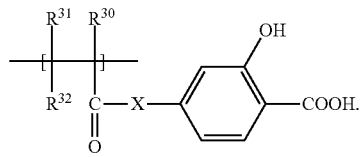

16. The composition of claim 13, wherein the cements are selected from Portland cements, aluminate cements and mixtures thereof.

17. The composition of claim 13, wherein the industrial or synthetic slags are selected from blast furnace slag, granulated blast furnace slag, ground granulated blast furnace slag, electrothermical phosphorus slag, stainless steel slag, and mixtures thereof.

18. The composition of claim 13, wherein the puzzolanic binders are selected from brown coal fly ash and mineral coal fly ash, metakaolin, natural puzzolans such as tuff, trass, volcanic ash, natural and synthetic zeoliths and mixtures thereof.

* * * * *